US010402690B2

(12) United States Patent
Vernaza et al.

(10) Patent No.: US 10,402,690 B2
(45) Date of Patent: Sep. 3, 2019

(54) SYSTEM AND METHOD FOR LEARNING RANDOM-WALK LABEL PROPAGATION FOR WEAKLY-SUPERVISED SEMANTIC SEGMENTATION

(71) Applicant: NEC Laboratories America, Inc., Princeton, NJ (US)

(72) Inventors: Paul Vernaza, Sunnyvale, CA (US); Manmohan Chandraker, Santa Clara, CA (US)

(73) Assignee: NEC Corporation (JP)

( * ) Notice: Subject to any disclaimer, the term of this patent is extended or adjusted under 35 U.S.C. 154(b) by 84 days.

(21) Appl. No.: 15/801,688

(22) Filed: Nov. 2, 2017

(65) Prior Publication Data

US 2018/0129912 A1 May 10, 2018

Related U.S. Application Data

(60) Provisional application No. 62/418,420, filed on Nov. 7, 2016, provisional application No. 62/421,422, filed on Nov. 14, 2016.

(51) Int. Cl.
*G06K 9/00* (2006.01)
*G06K 9/62* (2006.01)
(Continued)

(52) U.S. Cl.
CPC ....... *G06K 9/6256* (2013.01); *G06K 9/00791* (2013.01); *G06K 9/627* (2013.01);
(Continued)

(58) Field of Classification Search
CPC ............. G06K 9/6256; G06K 9/00791; G06K 9/6259; G06K 9/627; G06K 9/00718;
(Continued)

(56) References Cited

U.S. PATENT DOCUMENTS 7,460,709 B2 12/2008 Grady
9,336,433 B1 * 5/2016 Ortiz ................. G06K 9/00228
(Continued)

OTHER PUBLICATIONS

Bearman, "What's the Point: Semantic Segmentation with Point Supervision", ECCV, 2016, pp. 1-16.
(Continued)

*Primary Examiner* — Jose L Couso
(74) *Attorney, Agent, or Firm* — Joseph Kolodka

(57) ABSTRACT

Systems and methods for training semantic segmentation. Embodiments of the present invention include predicting semantic labeling of each pixel in each of at least one training image using a semantic segmentation model. Further included is predicting semantic boundaries at boundary pixels of objects in the at least one training image using a semantic boundary model concurrently with predicting the semantic labeling. Also included is propagating sparse labels to every pixel in the at least one training image using the predicted semantic boundaries. Additionally, the embodiments include optimizing a loss function according the predicted semantic labeling and the propagated sparse labels to concurrently train the semantic segmentation model and the semantic boundary model to accurately and efficiently generate a learned semantic segmentation model from sparsely annotated training images.

8 Claims, 5 Drawing Sheets

(51) Int. Cl.
  *G06T 7/10* (2017.01)
  *G06N 3/08* (2006.01)
  *G08G 1/16* (2006.01)
(52) U.S. Cl.
  CPC .......... *G06K 9/6259* (2013.01); *G06N 3/084* (2013.01); *G06T 7/10* (2017.01); *G06T 2207/20081* (2013.01); *G06T 2207/20084* (2013.01); *G06T 2207/30196* (2013.01); *G06T 2207/30241* (2013.01); *G08G 1/166* (2013.01)
(58) Field of Classification Search
  CPC ...... G06K 9/34; G06K 9/3241; G06K 9/4604; G06K 9/6218; G06K 9/6277; G06K 9/00711; G06K 9/00765; G06K 9/4676; G06K 9/50; G06K 9/52; G06K 9/6248; G06K 9/6264; G06K 9/6267; G06K 9/6268; G06K 9/6269; G06K 9/6272; G06K 9/628; G06K 9/6282; G06K 9/6296; G06K 9/6297; G06K 9/78; G06K 9/00664; G06K 9/4628; G06K 9/66; G06K 9/00523; G06K 9/00536; G06K 9/00671; G06K 9/6202; G06K 2009/4666; G06K 2009/6213; G06T 7/10; G06T 7/11; G06T 7/162; G06T 7/143; G06T 7/194; G06T 7/73; G06T 7/12; G06T 7/174; G06T 7/50; G06T 7/55; G06T 2207/20081; G06T 2207/20084; G06T 2207/30196; G06T 2207/30241; G06T 2207/10016; G06T 2207/20096; G06N 3/0454; G06N 3/04; G06N 3/08; G06N 3/084; G06N 3/02; G06N 3/0445; G06N 7/005; G06N 20/00; G05D 1/0088; G05D 1/0231; G05D 1/0246; G06Q 30/02; G06Q 50/30; G06Q 10/00; H04N 21/23412; H04N 21/23418; H04N 21/44008; H04N 5/23229; G05B 13/027; G06F 17/18; G06F 16/5854; G06F 16/7837; G06F 16/353; G06F 16/583; G06F 16/278

See application file for complete search history.

(56) References Cited

U.S. PATENT DOCUMENTS

| | | | | |
|---|---|---|---|---|
| 9,779,774 | B1* | 10/2017 | Kang | G06K 9/6218 |
| 9,939,272 | B1* | 4/2018 | Liao | G06K 9/00664 |
| 9,953,236 | B1* | 4/2018 | Huang | G06K 9/34 |
| 10,198,671 | B1* | 2/2019 | Yang | G06K 9/6269 |
| 2016/0055237 | A1* | 2/2016 | Tuzel | G06F 16/353 |
| | | | | 382/224 |
| 2016/0350930 | A1* | 12/2016 | Lin | G06K 9/66 |
| 2016/0358337 | A1* | 12/2016 | Dai | G06T 5/10 |
| 2019/0042871 | A1* | 2/2019 | Pogorelik | G06K 9/40 |
| 2019/0043203 | A1* | 2/2019 | Fleishman | H04N 13/261 |

OTHER PUBLICATIONS

Lin, "ScribbleSup: Scribble-Supervised Convolutional Networks for Semantic Segmentation", CVPR, 2016, pp. 3159-3167.
Pathak, "Constrained Convolutional Neural Networks Weakly Supervised Segmentation", CVPR, 2015, pp. 1706-1804.
Xu, "Learning to Segment Under Various Forms of Weak Supervision", CVPR, 2015, pp. 3781-3790.

\* cited by examiner

SYSTEM AND METHOD FOR LEARNING RANDOM-WALK LABEL PROPAGATION FOR WEAKLY-SUPERVISED SEMANTIC SEGMENTATION

RELATED APPLICATION INFORMATION

This application claims priority to 62/418,420, filed on Nov. 7, 2016, and to 62/421,422, filed on Nov. 14, 2016, incorporated herein by reference herein their entirety.

BACKGROUND

Technical Field

The present invention relates to semantic segmentation of images and more particularly to training a neural network for weakly supervised semantic segmentation by learning random-walk label propagation.

Description of the Related Art

Computer vision is a rapidly growing field of endeavor that often leverages the power of machine learning to develop an ability on the part of a computer to identify objects in an image. One technique for solving common computer vision problems has become known as semantic segmentation. Semantic segmentation may be used in real-world applications such as object recognition, medical imaging, autonomous driving, indoor navigation, augmented reality and virtual reality.

However, semantic segmentation often utilizes machine learning techniques, such as neural networks, which require extensive training in order to attain accurate segmentation performance. This training may make use of datasets with annotations for training the neural network, and the annotations may have varying levels of density. The greater the density of the annotations, the greater the cost in producing the dataset, and therefore, in training. As a result, previous methods must choose between the high expense of densely annotated training sets, or training with the cheaper sparsely annotated datasets.

Training with sparsely annotated datasets tends to result in poorer training performance because it relies on fixed heuristics to infer dense annotations from the original sparse annotations. However, fixed heuristics require more assumptions and is therefore limited in adaptability. Accordingly, training with fixed heuristics similarly limits the accuracy of the neural network, imposing an upper bound on the performance of the semantic segmentation.

SUMMARY

According to an aspect of the present principles, a method is provided for training semantic segmentation. The method includes a step for predicting semantic labeling of each pixel in each of at least one training image using a semantic segmentation model. Further included is a step for predicting semantic boundaries at boundary pixels of objects in the at least one training image using a semantic boundary model concurrently with predicting the semantic labeling. The method also includes a step for propagating sparse labels to every pixel in the at least one training image using the predicted semantic boundaries. Additionally, the method includes a step for optimizing a loss function according to the predicted semantic labeling and the propagated sparse labels to concurrently train the semantic segmentation model and the semantic boundary model to accurately and efficiently generate a learned semantic segmentation model from sparsely annotated training images.

According to another aspect of the present principles, a system is provided for training a semantic segmentation device. The system includes a semantic labeling module, configured to predict a semantic labeling of each pixel in each of at least one training image using a semantic segmentation model stored in a memory. The system further includes a boundary prediction module configured to predict semantic boundaries at boundary pixels of objects in the at least one training image using a semantic boundary model concurrently with predicting the semantic labeling, wherein the semantic boundary model is stored in a memory, and a label propagation module configured to propagate sparse labels to every pixel in the at least one training image using the predicted semantic boundaries. The system additionally includes an optimization module, including a processor, configured to optimize a loss function according to the predicted semantic labeling and the propagated sparse labels to concurrently train the semantic labeling module and the boundary prediction module to accurately and efficiently generate a learned semantic segmentation model from sparsely annotated training images.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
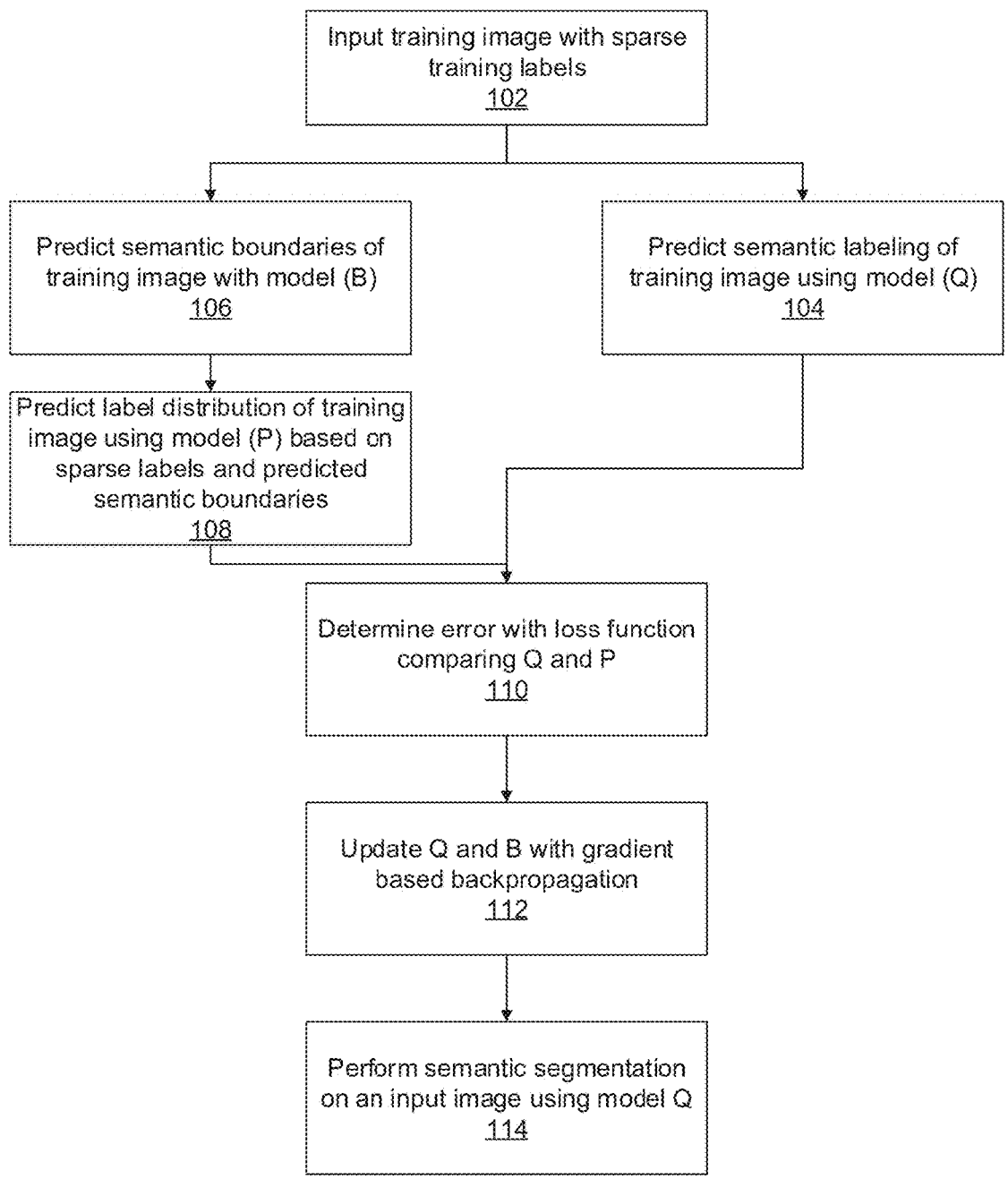
FIG. 1 is a block/flow diagram illustrating a high-level system/method for learning random-walk label propagation for weakly-supervised semantic segmentation, in accordance with the present principles.

In accordance with the present principles, systems and methods are provided for learning random-walk label propagation for weakly-supervised semantic segmentation. In one embodiment, a sparsely annotated training set is employed to train a neural network, such as, e.g. a convolutional neural network (CNN), by jointly training a boundary predictor and a semantic segmentation predictor, while retaining the benefits of using an expensive densely annotated dataset.

A training image from a dataset may have sparse annotations including object labels (ground-truth labels) at a subset of pixels within the image. A semantic labeling model may then use a CNN of an arbitrary type to predict the semantic segmentation from the image alone. Concurrently, a boundary predictor, which may include a separate CNN, may be used to predict object boundaries from the image alone. A label propagator may then infer labels for each pixel in the image using the ground-truth labels and the location of the ground-truth labels relative to the locations of the boundaries. Upon propagating labels and semantic segmentation, a loss function may be used to determine an error between the propagated labels and the semantic segmentation, and backpropagate the error to the semantic labeling model and the boundary predictor.

Each training image, therefore, improves both the boundary predictor and the semantic labeling predictor concurrently. As a result, rather than using fixed heuristics to guess at dense labels in the training image, aspects of the present invention form an inductive process that enables ever improving boundary prediction, and therefore, ever improving label propagation. Therefore, as training progresses, the model for inferring dense annotations improves, thus improving the training of the semantic labelling predictor. As a result, the resulting semantic labeling model may be as accurate as if it were trained with densely annotated training data, while only requiring cheaper, sparsely annotated training data. Thus, embodiments of the present invention provide a data-driven approach to training with a sparsely annotated dataset that can scale fully with data to continually improve the accuracy of semantic segmentation as the learning process progresses and improving the use of computational resources leading to faster and more accurate processing.

Accordingly, the trained semantic labeling predictor may then be employed to perform semantic segmentation in unknown images, such as for road detection and scene understanding in autonomous vehicles. Due to the improved training discussed above, one or more image sensors of an autonomous vehicle can include the semantic labeling predictor. The autonomous vehicle can therefore be more accurately and cheaply trained to determine and understand a path of the road as well as objects located thereon, and thus take appropriate action.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a high-level system/method for learning random-walk label propagation for weakly-supervised semantic segmentation is illustratively depicted in accordance with one embodiment of the present principles.

In one embodiment, a semantic labeling model (Q) 104 may be trained using datasets including sparsely labeled training images 102. The training image and its sparse training labels 102 are input into the semantic labeling model (Q) 104 to predict a labeled image. The semantic labeling model (Q) 104 may include a CNN of any suitable type. In a particular aspect of the embodiment of the present invention, the semantic labeling model (Q) 104 predicts labels for each pixel of the training image using the training image and a learned parameter ($\theta$), but it may also incorporate the sparse training labels to predict the labels for each pixel. For example, the semantic labeling model (Q) 104 may predict the labeling of objects near a road viewed from an autonomous vehicle (see, FIG. 5). Such objects would be labeled according to the prediction of the semantic labeling model (Q) 104 on a pixel-by-pixel basis.

Concurrently with the semantic labeling model (Q) 104, a semantic boundary model (B) 106 may predict the semantic boundaries of the training image. The semantic boundary model (B) 106 may include a CNN of any suitable type. In a particular aspect of the embodiment of the present invention, the semantic boundary model (B) 106 predicts boundaries between objects depicted in the training image using the training image and a learned parameter ($\phi$).

A label propagation model (P) 108 may be used to predict a distribution of labels for each pixel on the training image. Due to the predicted boundaries by the semantic boundary model (B) 106, the label propagation model (P) 108 accesses the training image and its sparse labels, as well as object boundaries on the training image. As a result, the label propagation model (P) 108 may predict a label for a given pixel on the training image given the sparse labels and the predicted boundaries. The predicted boundaries may define areas of high probability and of low probability that a given label propagated to pixels in those areas would approach the ground-truth.

According to an aspect of embodiments of the present invention, the probabilities for label propagation by the label propagation model (P) 108 may use a random-walk-hitting probability distribution to define a probability distribution of pixels having a given label. In this way, label propagation model (P) 108 produces a labeling simulation based on a trained semantic boundary model (B) 106 and sparse labels. Because the semantic boundary model (B) 106 can be trained, performance of the semantic boundary model (B) 106, and therefore, the label propagation model (P) 108, can continually improve as more data is used for training. Accordingly, the probability distribution for each label approaches closer to the ground-truth distribution, and thus achieve similar benefits to training datasets having dense annotations without the attendant costs of acquiring such datasets.

Both the label distribution from the label propagation model (P) 108 and the predicted labeling from the semantic labeling model (Q) 104 may then be optimized by minimizing a loss function 110 such as, e.g., Equation 1 below:

$$\min_\theta \sum_{x \in X} H(P_{y(x)|\hat{y},B_{\phi,I}}, Q_{\theta,I}(x)), \qquad \text{Equation 1}$$

where H is a loss function such as a cross entropy loss function, $B_{\phi,I}$ is a semantic boundary predictor (e.g. a CNN) for predicting semantic boundaries using learned parameter $\phi$ evaluated on image I, $P_{y(x)|\hat{y},B_{\phi,I}}$ is a predicted label y for each pixel x given sparse labels $\hat{y}$ and the semantic boundary predictor $B_{\phi,I}$, y(x) are dense labels (a label y for each pixel x), $Q_{\theta,I}(x)$ is a semantic label predictor (e.g. a CNN) for predicting a label using parameters $\theta$ evaluated on image I at pixel x, and X is a set of all pixel locations.

As an alternative embodiment, the loss function H may be modified to include uncertainty weighting (not shown). In areas where the semantic boundary model (B) 106 fails to predict a boundary of an object, or predicts a boundary with high uncertainty, the label distribution may include a degree of uncertainty. As a result, the loss function H may include a term for down-weighting the loss proportional to an uncertainty estimate. Such down-weighting may take the form of the modified loss function H of Equation 2 below:

$$\min_\theta \sum_{x \in X} w(x) KL(P_{y(x)|\hat{y},B_{\phi,I}} || Q_{\theta,I}(x)) + H(P_{y(x)|\hat{y},B_{\phi,I}}), \qquad \text{Equation 2}$$

where $w(x)=\exp(-\alpha H(P_{y(x)|\hat{y},B_{\phi,I}}))$ is the weight at a pixel x and KL is KL divergence of P and Q.

As discussed above, label propagation may be performed by the label propagation model (P) 108 using a random-walk-hitting simulation. A random-walk solution to label propagation enables a fully differentiable model for propagating labels. As a result, loss function (H) 110 can be efficiently minimized using a gradient based approach with backpropagation 112. The backpropagation can, therefore, concurrently train the learned parameters $\phi$ and $\theta$ of the semantic boundary model (B) 106 and the semantic labeling model (Q) 104 respectively. Therefore, training the semantic labeling model (Q) 104 using a semantic boundary model (B) 106 using a random-walk simulation enables the semantic boundary model (B) 106 to itself be trained in the same process. As a result, the process is inductive and scalable with data, thus resulting in a semantic labeling model (Q) that is more accurate than previously thought possible.

The trained semantic labeling model (Q) may then be used to identify objects depicted in input images at block 114. According to an aspect of the invention, the semantic labeling model (Q) may be trained for autonomous vehicle applications. Therefore, an autonomous vehicle including one or more image sensors may take images of a road scene. The trained semantic labeling model (Q) may then evaluate the road scene according to the learned parameters $\theta$ and predict the labeling of each pixel in the images with an appropriate label with high accuracy. Therefore, the trained semantic labeling model (Q) can accurately identify objects and understand the road scene, thus improving safety and performance of the autonomous vehicle, such as the autonomous vehicle depicted in FIG. 5, described below. However, other applications have been contemplated, such as various autonomous platforms (e.g., drones), surveillance systems, or medical imaging systems.

Figure 2:
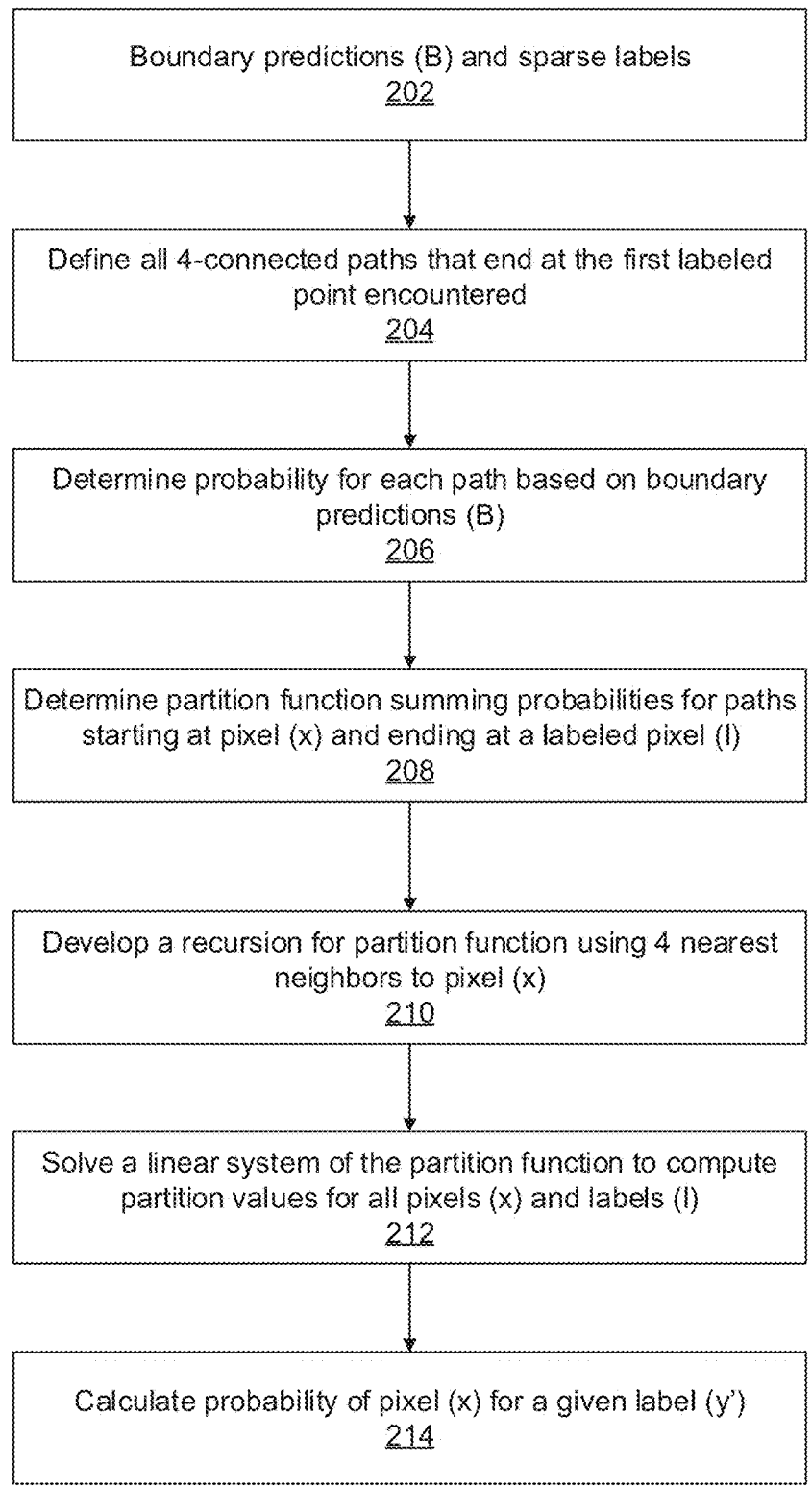
FIG. 2 is a block/flow diagram illustrating a system/method for random-walk label propagation, in accordance with the present principles.

Referring now to FIG. 2, a system/method for random-walk label propagation for weakly-supervised semantic segmentation is illustratively depicted in accordance with an embodiment of the present principles.

According to an aspect of the present invention, a label propagation model (P) may use a semantic boundary model (B) and sparse labeling to predict pixel-wise label distribution in a training image. According to embodiments of the present invention, this process includes providing, at block 202, boundary predictions and sparse labels for label propagation.

Using the boundary predictions and the sparse labels, a set of all 4-connected paths from pixel x to a pixel having a particular label l can be created at block 204. According to aspects of the present invention, a 4-connected path refers to a path created by a series of pixels, each of which is one of the four nearest neighbors to a subsequent pixel in the path. Using this set of 4-connected paths, a probability for each path can be determined at block 206 using the boundary predictions. This path probability may decay exponentially as a path crosses a boundary, as per Equation 3 below:

$$P(\xi) \propto \exp\left(-\sum_{t=0}^{\tau(\xi)-1} B_{\phi,I}(\xi_t)\right) \frac{1}{4}^{\tau(\xi)}, \qquad \text{Equation 3}$$

where $\xi_t$ is a random-walk path that is 4-connected from a pixel x to a labeled point l, $\tau(\xi)$ is the path stopping time for a random-walk, t is a time step along the random-walk path, and $P(\xi)$ is an assigned probability of a random-walk path given the boundary prediction $B_{\phi,I}$.

According to aspects of the present invention, Equation 3 provides a probability for a given path that connects pixel x to a particular label l. As a result, at block 208, Equation 3 can then be used to generate a partition function that aggregates and sums the probability of all such paths. This partition function enables a recursion at block 210 that evaluates the probability of a particular pixel x adjoining a particular label l, and thus also having that label l, depending on the probability of the 4 nearest neighbor pixels to pixel x according to Equation 4 below:

$$Z_{xl} = \frac{1}{4}\exp(-B_{\phi,I}(\xi_t)) \sum_{x' \sim x} Z_{x'l}, \qquad \text{Equation 4}$$

where $Z_{xl}$ is a partition function summing the probability distribution of all 4-connected paths starting at pixel x and ending at a pixel labeled l, $Z_{x'l}$ is a partition function summing the probability distribution of all 4-connected paths starting at pixel x' and ending at a pixel labeled l, and x' is one of the 4 nearest neighbors to pixel x. Equation 4 constitutes a linear system that is input at block 212, along with boundary conditions, to a linear system solver to produce a set of solution values $Z_{xl}$ for all x and l.

Having computed $Z_{xl}$, Equation 5 below can be used to compute, at block 214, the probability of a given pixel x having a pixel label y':

$$P_{y(x)|\hat{y},B_{\phi,I}}(y') = \frac{Z_{xy'}}{\sum Z_{xl}},\qquad \text{Equation 5}$$

where y' is a particular label from a set including the sparse labels. The label set may be chosen for a particular application, such as autonomous driving, or may include labels pertinent to a variety of applications and situations.

According to aspects of the present invention, Equation 5 enables the computation of loss derivatives in order to facilitate backpropagation. Because the partition function Z is essentially a linear system, finding the loss derivative based on a change in the boundary prediction is relatively easy, resulting in a point-wise loss derivative function such as $$A^T \frac{dL}{dC_i} = \frac{dL}{dz_i}$$

where A is square with the ith rows corresponding to the constraints $C_i Z_{x_i} = \sum_{x'-x_i} Z_{x'}$, $Z_{x_i} = 0$, or $Z_{x_i} = 1$ (as appropriate), where $C_i = \exp(B_{\phi,I}(x_i))$, $z_i = Z_{x_i}$ (assigning a unique linear index i to each $x_i$ within the image and temporarily omitting the dependence on l), $A^T$ is the transpose of matrix A, and L is the loss.

The above process results in a pixel-wise label distribution over the entire image based on the sparse labels and the boundary predictions, without any fixed heuristics. As a result, the label propagation is inductive and data-driven, thus improving in performance and accuracy as the boundary prediction model (B) is trained. The label propagation can thus be continually improved to better train a semantic labelling model (Q) without the need for fixed heuristics or for densely annotated training images. Accordingly, the semantic labeling model (Q) can be trained more efficiently and more accurately, gaining the benefits of dense annotation with the decreased cost of sparse annotations.

Figure 3:
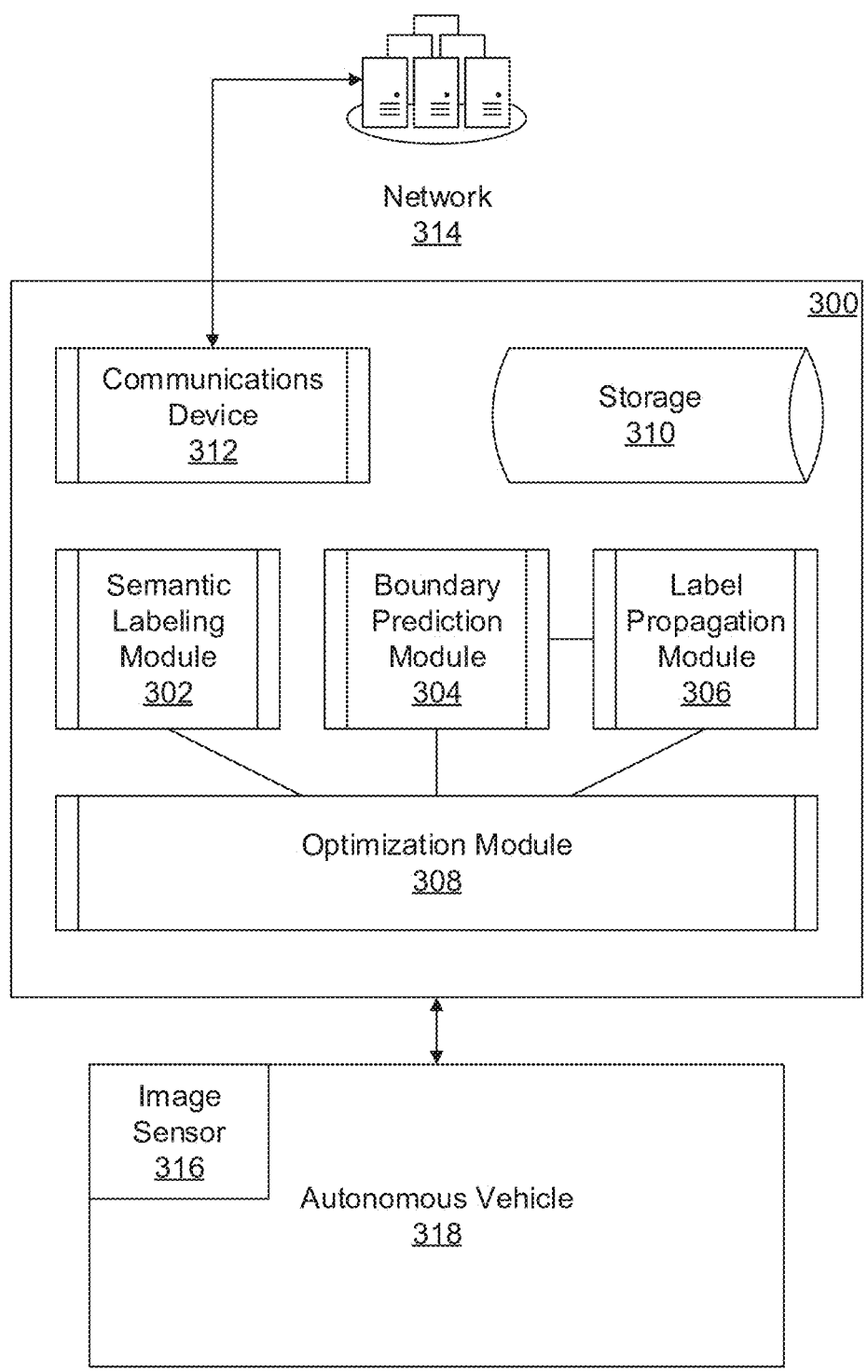
FIG. 3 is a flow diagram illustrating a system/method for learning random-walk label propagation for weakly-supervised semantic segmentation, in accordance with the present principles.

Referring now to FIG. 3, a system for learning random-walk label propagation for weakly-supervised semantic segmentation is illustratively depicted in accordance with an embodiment of the present principles.

In accordance with aspects of the present invention, a semantic segmentation device 300 includes modules for learning random-walk label propagation in order to perform weakly-supervised semantic segmentation in autonomous vehicle applications.

Semantic segmentation device 300 includes a semantic labeling module 302. The semantic labeling module 302 may include a semantic labeling model (Q) to be trained using datasets including sparsely labeled training images. The sparsely annotated training imaged may be provided to the semantic labeling module 302 via a storage 310 storing the dataset, or from a remote storage on network 314 via a communications device 312. The storage 310 may include any suitable non-transitory computer readable medium. The communications device 312 may include components for either wired or wireless communication of any suitable protocol with network 314. The semantic labeling model (Q) of the semantic labeling module 302 may include a CNN of any suitable type. In a particular aspect of the embodiment of the present invention, the semantic labeling module 302 predicts labels for each pixel of a training image using the training image and a learned parameter (θ), but it may also incorporate the sparse training labels to predict the labels for each pixel.

The semantic segmentation device 300 may further include a label propagation module 306 and a boundary prediction module 304. The boundary prediction module 304 may be part of the label propagation module 306, or it may be a separate module. The boundary prediction module 304 may using the training image to predict object boundaries in the image according to a semantic boundary model (B). The semantic boundary model (B) may include a CNN of any suitable type. In a particular aspect of the embodiment of the present invention, the semantic boundary model (B) predicts boundaries between objects depicted in the training image using the training image and a learned parameter (φ).

The boundary predictions, as well as the training image and sparse labels of training image may then be used by the label propagation module 306 to infer the labels for every pixel in the training image using a label propagation model (P) according to the sparse labels and the predicted object boundaries. According to embodiments of the present invention, the predicted boundaries may define areas of high probability and of low probability that a given label propagated to pixels in those areas would approach the ground-truth.

According to an aspect of embodiments of the present invention, the label propagation model (P) of the label propagation module 306 may include a random-walk-hitting probability simulation to define a probability distribution of pixels having a given label. In this way, label propagation model (P) produces a labeling simulation based on a trained semantic boundary model (B) and sparse labels. Because the boundary prediction module 304 can be trained, performance of the semantic boundary model (B), and therefore, the label propagation model (P), can continually improve as more data is used for training. Accordingly, the probability distribution for each label approaches closer to the ground-truth distribution, and thus achieve similar benefits to training datasets having dense annotations without the attendant costs of acquiring such datasets.

Both the label distribution from the label propagation module 306 and the predicted labeling from the semantic labeling module 302 may then be optimized with an optimization module 308. The optimization module 308 may be configured for minimizing a loss function such as Equation 1 discussed above. As an alternative embodiment, the loss function H may be modified to include uncertainty weighting (not shown). In areas where the boundary prediction module 304 fails to predict a boundary of an object, or predicts a boundary with high uncertainty, the label distribution may include a degree of uncertainty. As a result, the loss function H may include a term for down-weighting the loss proportional to an uncertainty estimate. Such down-weighting may take the form of the modified loss function H of Equation 2 discussed above.

Upon minimizing of the loss function by the optimization module 308, the optimization module 308 may backpropagate the loss determined from loss function H to the boundary prediction module 304 and the semantic labeling module 302. As a result, each of the boundary prediction module 304 and the semantic labeling module 302 may concurrently train the semantic boundary model (B) and the semantic labeling model (Q) respectively. Because labels were propagated by the label propagation module 306 using a random-walk-hitting simulation, the loss will be differentiable. As a result, the optimization module 308 may perform backpropagation using an efficient gradient based method to train the semantic boundary model (B) and the semantic labeling model (Q).

According to an embodiment of the present invention, the trained semantic labeling module 302 may then identify objects depicted in input images from one or more image sensors of an autonomous vehicle. Therefore, the autonomous vehicle may take images from the image sensor 316. The trained semantic labeling module 302 may then evaluate the image according to the learned model semantic labeling model (Q) to predict the labeling of each pixel in the medical image with an appropriate label with high accuracy, and convey a labeled image to a processor of the autonomous vehicle 318. The autonomous vehicle may then take appropriate action based on the labeled image. The label image may include labeled traffic signs, lane lines, roadways and turns, or objects on the road such as other cars, people, bicycles or others. As a result, the semantic segmentation device 300 provides the autonomous vehicle with enhanced road scene understanding, enable the autonomous vehicle to more appropriately respond to road scene changes, increasing the efficiency of processing the scene and increasing the safety of the vehicle on the whole.

Figure 4:
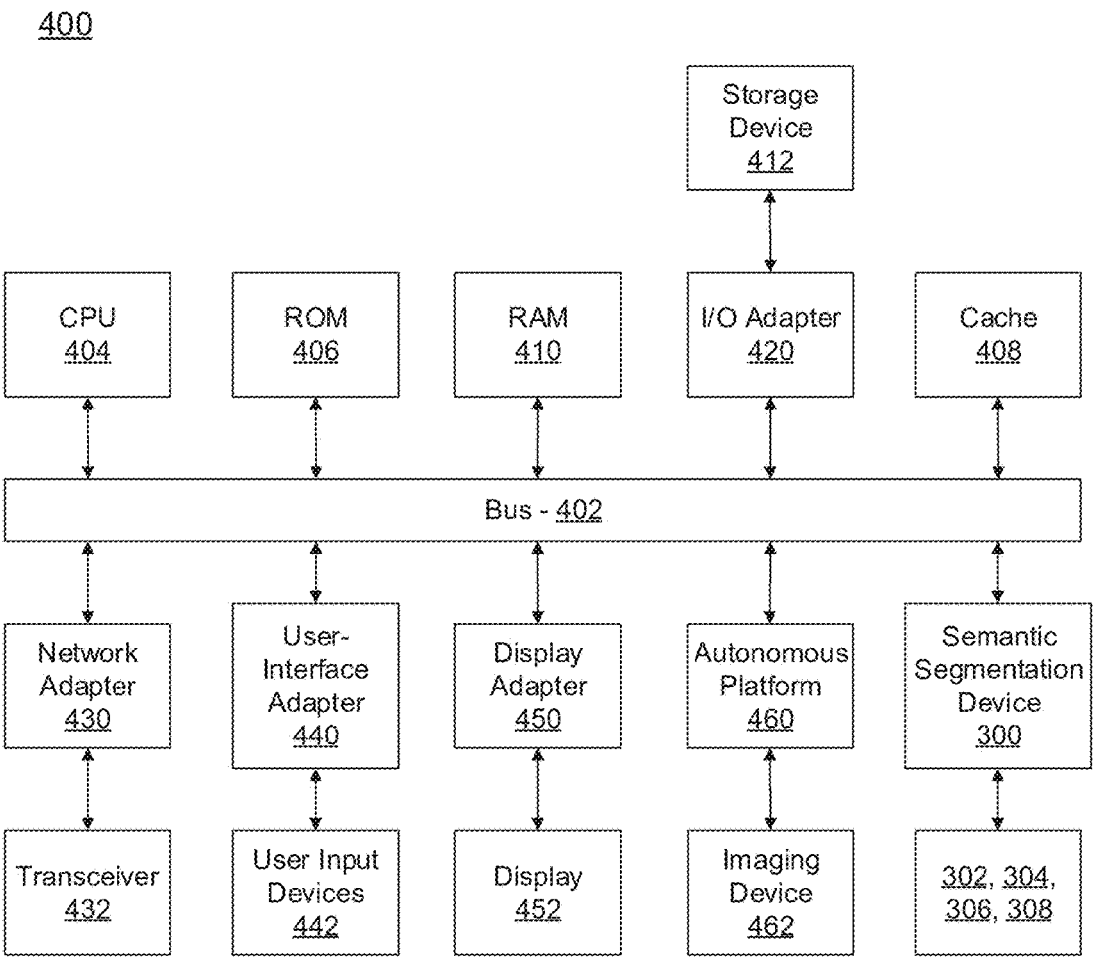
FIG. 4 is a block/flow diagram illustrating a system/method for processing images with random-walk label propagation for weakly-supervised semantic segmentation, in accordance with the present principles.

Referring now to FIG. 4, an exemplary processing system for learning random-walk label propagation for weakly-supervised semantic segmentation, in accordance with embodiments of the present invention.

The processing system 400 includes at least one processor (CPU) 404 operatively coupled to other components via a system bus 402. A cache 408, a Read Only Memory (ROM) 406, a Random Access Memory (RAM) 410, an input/output (I/O) adapter 420, a network adapter 430, a user interface adapter 440, and a display adapter 450, are operatively coupled to the system bus 402. Additionally, a semantic segmentation device 300 and an autonomous platform 460 are operatively coupled to the system bus 402.

The semantic segmentation device 300 is operatively coupled to semantic labeling module 302, boundary prediction module 304, label propagation module 306 and optimization module 308.

The autonomous platform 460 is operatively connected to an imaging device 462, which may capture images for processing by the processing system 400. The autonomous platform 460 may be any device or system with the ability to self-control based on the processed images. Such devices or systems may be autonomous vehicles (e.g., cars, trucks, etc.), drones, digital imaging systems with automatic focusing, object recognition systems, security surveillance systems, medical imaging systems, etc.

A storage device 422 is operatively coupled to system bus 402 by the I/O adapter 420. The storage device 422 can be any of a disk storage device (e.g., a magnetic or optical disk storage device), a solid state magnetic device, and so forth.

A transceiver 432 is operatively coupled to system bus 402 by network adapter 430.

User input devices 442 are operatively coupled to system bus 402 by user interface adapter 440. The user input devices 442 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 442 can be the same type of user input device or different types of user input devices. The user input devices 442 are used to input and output information to and from the processing system.

A display device 452 is operatively coupled to system bus 402 by display adapter 450.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 5:
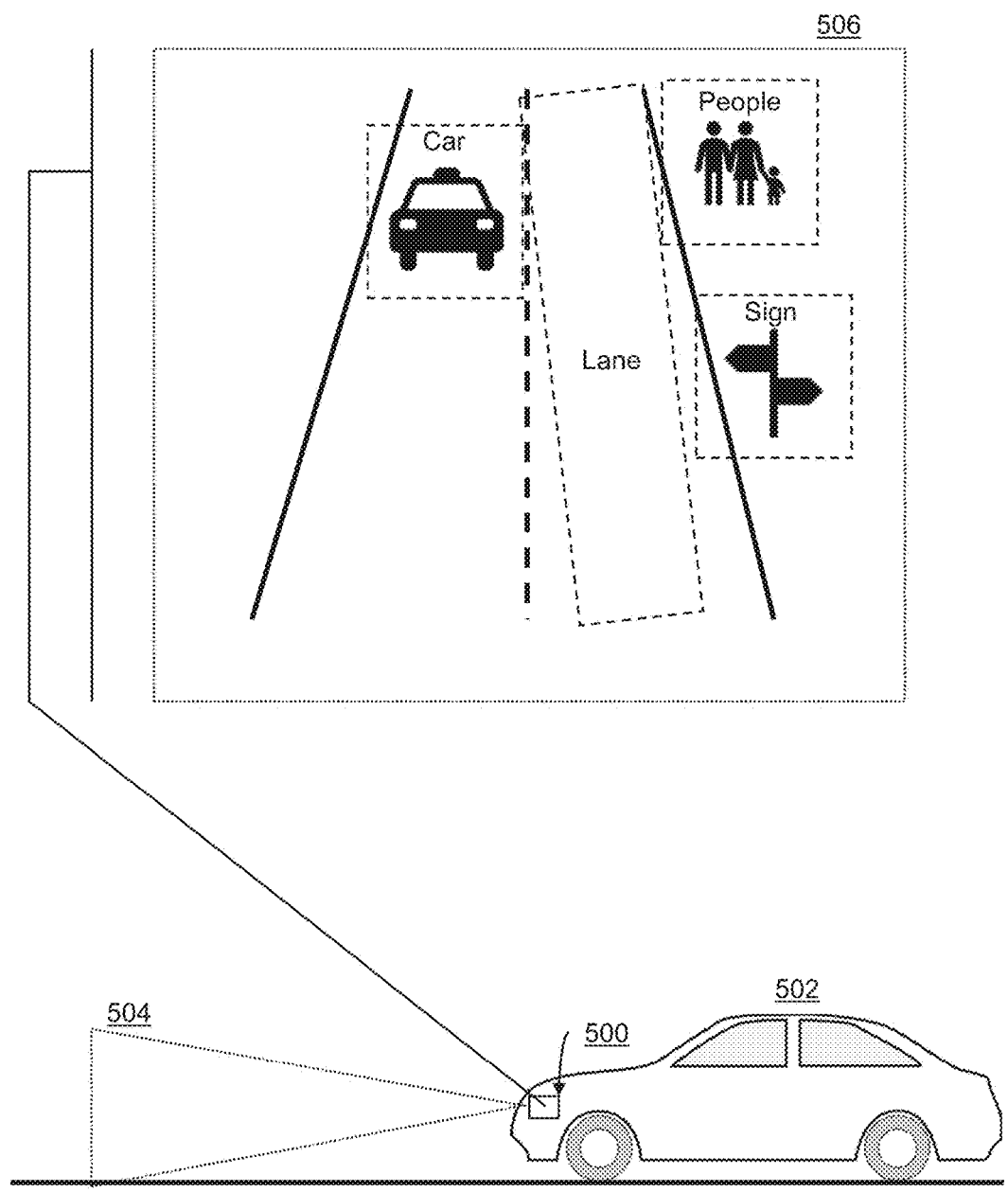
FIG. 5 is an illustration of a system/method for implementing random-walk label propagation for weakly-supervised semantic segmentation for autonomous vehicles, in accordance with the present principles.

Referring now to FIG. 5, an exemplary autonomous vehicle with random-walk label propagation for weakly-supervised semantic segmentation, in accordance with an embodiment of the present invention.

According to aspects of the present invention, an embodiment may include a vehicle 502 configured to autonomous or semi-autonomous driving through the use of an imagining device 500. The imaging device 500 may include both an image sensor and an image processor, such as the processing system 400 of FIG. 4. However, the image processor may be different from the processing system 400, or may be external to the imaging device 500, and even external to the autonomous vehicle 502 entirely.

Image sensor of the imaging device 500 may generate an image or series of images, such as images of the road ahead within its view 504. The generated images may be processed by an image processor to perform semantic segmentation according to aspects of the present invention, such as semantic segmentation with a semantic segmentation device 300 as depicted in FIG. 3. Using a trained semantic segmentation model from a semantic segmentation device, e.g., semantic segmentation device 300, a semantically segmented image 506 may be provided to the autonomous vehicle 502.

The semantically segmented image 506 enables the autonomous vehicle 502 to recognize objects to inform autonomous or semi-autonomous driving. For example, the imaging device 500 may provide the autonomous vehicle 502 with an image of the road ahead 506 where the imaging device 500 has recognized and labeled objects such as car in the opposite, people on the side of the road, a sign, and the right lane of the road.

The use of a semantic segmentation device according to aspects of the present invention, such as the semantic segmentation device 300, ensures that the image 506 is accurate and efficiently processed because it has been trained through random-walk label propagation from sparsely labeled data. As a result, the autonomous car 502 can be more cheaply produced and operated because the training data is cheaper, while still improving accuracy, resulting in safer and more efficient operation. In fact, because the training of imaging device 500 uses a data driven approach such as random-walk propagation for training a semantic segmentation model, there is no artificial limit on the accuracy of the model. Accordingly, the imaging device 500 can be continually trained to continually improve the accuracy of semantic segmentation, thus resulting in more accurate and more efficient semantic segmentation, ultimately leading to a safer autonomous vehicle.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for training semantic segmentation, comprising:
    predicting semantic labeling of each pixel in each of at least one training image using a semantic segmentation model;
    predicting semantic boundaries at boundary pixels of objects in the at least one training image using a semantic boundary model concurrently with predicting the semantic labeling;
    propagating sparse labels to every pixel in the at least one training image using the predicted semantic boundaries; and
    optimizing a loss function according the predicted semantic labeling and the propagated sparse labels to concurrently train the semantic segmentation model and the semantic boundary model to accurately and efficiently generate a learned semantic segmentation model from sparsely annotated training images;
    wherein propagating the sparse labels includes a random-walk simulation based on the predicted semantic boundaries and the sparse labels;
    wherein the random-walk simulation includes:
        determining for each pixel on the training image, a plurality of paths from the pixel to each label of the sparse labels;
        determining a probability of each path reaching a particular label; and
        determining a probability distribution for each of the sparse labels across each pixel of the training image based on the probability of each path reaching a particular label.

2. The method as recited in claim 1, wherein each of the plurality of paths includes a 4-connected path.

3. The method as recited in claim 1, wherein the propagating includes:
    generating a partition function summing each probability for each path from the pixel; and
    developing a recursion from the partition function based on four nearest neighbor pixels to the pixel for calculating a probability that the pixel has a path reaching the particular label.

4. The method as recited in claim 1, wherein determining the probability of each path includes decaying the probability exponentially where the path crosses at least one of the predicted semantic boundaries.

5. A system for training a semantic segmentation device, comprising:
    a semantic labeling module, configured to predict a semantic labeling of each pixel in each of at least one training image using a semantic segmentation model stored in a memory;
    a boundary prediction module configured to predict semantic boundaries at boundary pixels of objects in the at least one training image using a semantic boundary model concurrently with predicting the semantic labeling, wherein the semantic boundary model is stored in a memory;
    a label propagation module configured to propagate sparse labels to every pixel in the at least one training image using the predicted semantic boundaries;
    an optimization module, including a processor, configured optimize a loss function according the predicted semantic labeling and the propagated sparse labels to concurrently train the semantic labeling module and the boundary prediction module to accurately and efficiently generate a learned semantic segmentation model from sparsely annotated training images;
    wherein propagating the sparse labels includes a random-walk simulation based on the predicted semantic boundaries and the sparse labels; and
    wherein the random-walk simulation includes:
        determining for each pixel on the training image, a plurality of paths from the pixel to each label of the sparse labels;
        determining a probability of each path reaching a particular label; and
        determining a probability distribution for each of the sparse labels across each pixel of the training image based on the probability of each path reaching a particular label.

6. The system as recited in claim 5, wherein each of the plurality of paths includes a 4-connected path.

7. The system as recited in claim 5, wherein the propagating includes:
    generating a partition function summing each probability for each path from the pixel; and
    developing a recursion from the partition function based on four nearest neighbor pixels to the pixel for calculating a probability that the pixel has a path reaching the particular label before any other label.

8. The system as recited in claim 5, wherein determining the probability of each path includes decaying the probability exponentially where the path crosses at least one of the predicted semantic boundaries.

* * * * *